April 10, 1928.
F. J. EBEL
1,665,951
COMBINATION MOUSE AND RAT TRAP
Filed June 30, 1925
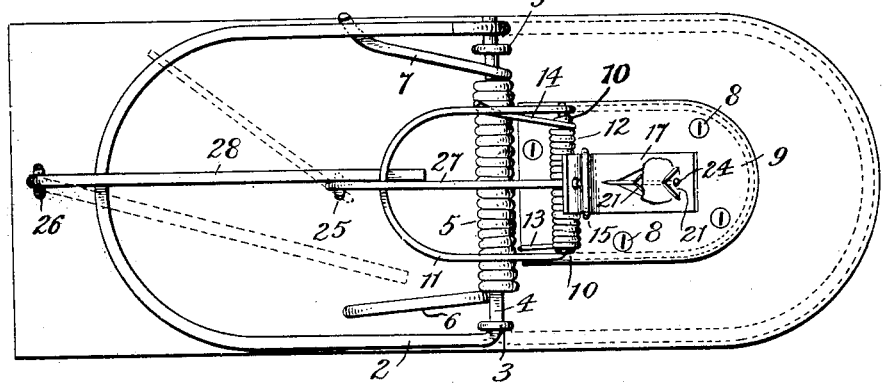
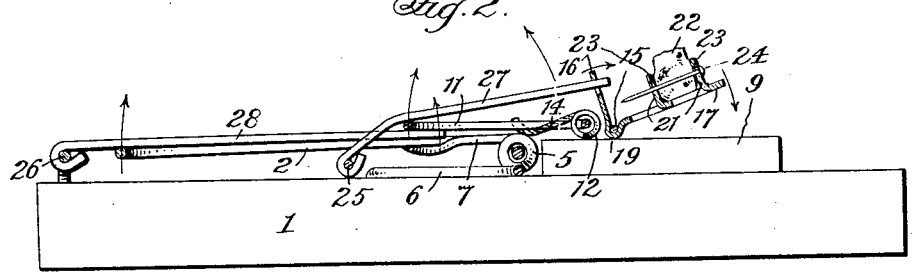
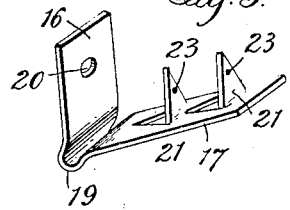
Inventor:
Frank J. Ebel,
By Milans & Milans
Attorneys.
Witness:
Jas. E. Hutchinson.

Patented Apr. 10, 1928.

1,665,951

UNITED STATES PATENT OFFICE.

FRANK J. EBEL, OF NEW ORLEANS, LOUISIANA.

COMBINATION MOUSE AND RAT TRAP.

Application filed June 30, 1925. Serial No. 40,590.

My invention relates to new and useful improvements in traps and more particularly to a combined mouse and rat trap, the principal object of the invention residing in the provision of a single trap which will be adapted for catching a mouse or a much larger rat.

A further object of the invention resides in the provision of a plurality of spring controlled swinging members adapted for engaging the animals, the members being of different sizes and adapted to be released by a single trip or trigger.

Another object of the inevntion resides in the provision of a novel form of trip or trigger, said trip or trigger having means whereby the bait may be secured thereto against accidental displacement.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a top plan of the trap set ready for use.

Fig. 2 is a side elevation of the trap set ready for use, and

Fig. 3 is a detail perspective showing the trip or trigger.

Ordinarily a relatively small trap is used for catching mice whereas a larger trap is used for catching rats. If a relatively small trap is set for catching a mouse and is tripped by a rat it can readily be appreciated that it would not be of sufficient strength to kill the rat or hold the same whereas if a relatively large trap is set for catching a rat and is tripped by a mouse it will be of such a size to, at times, entirely miss the mouse. With the construction which I have provided the one trap may be used for either catching a rat or a mouse and will securely hold the same.

In the drawings 1 indicates a base, preferably of wood, and while I have illustrated, in the drawings, the base of a shape to provide one end straight and the opposite end rounded it will be understood that different shapes may be used such as both ends being straight or both ends rounded. The swinging member 2, of wire, as shown, is secured to the upper surface of the base 1 by means of the staples 3 or other suitable means which engage the end portion 4 as more particularly illustrated in Fig. 1 of the drawings. Surrounding the end portion 4 of the swinging member 2 is the coiled spring 5, one end of which, 6, engages the upper surface of the base 1 and the opposite end 7 engages one side arm of the member 2 normally swinging the member 2 towards the rounded end of the base as shown in dotted lines in Fig. 1 of the drawings.

Secured to the top of the base 1 by means of the screws 8 or other suitable fasteners is the supplemental base 9 and secured to the upper surface of the supplemental base by means of the staples 10 or other suitable securing means is the swinging member 11 of wire. Surrounding one end of the member 11, between the staples 10, is a coiled spring 12, one end, 13, of the spring engaging the upper surface of the supplemental base and the opposite end 14 engaging one side arm of the swinging member so as to normally hold the same as shown by dotted lines in Fig. 1 of the drawings.

Secured to the top of the supplemental base 9 by means of the staple 15 or other suitable fastening means is the trip or trigger shown more particularly in Fig. 3 of the drawings. This trip or trigger comprises the arms 16 and 17, at substantially right angles, a recess or groove 19 being provided at the point where the arms are connected for receiving the horizontal portion of the staple 15 as more particularly illustrated in Figs. 1 and 2 of the drawings. An opening 20 is formed in the arm 16 and struck from the arm 17 are the prongs 21 which normally extend upwardly as shown to receive the bait 22 therebetween. Each of the prongs 21 is provided with an opening 23 and a pin 24 is adapted to be passed through the openings 23 and through the bait 22 for securely holding the bait in position against accidental displacement.

Secured to the base 1, by the staples 25 and 26, respectively, are the rods 27 and 28, the rod 27 being adapted for engagement over the end of the swinging member 11 with the free end thereof in the opening 20 of the trip or trigger. When thus held the parts will be in the position shown in full lines in Figs. 1 and 2 of the drawings, the arm or end 14 of the coiled spring 12 being placed under tension. The rod 28 is adapted to engage over the end of the swinging member 2 and to be engaged beneath the end of the swinging member 11 as is more particularly illustrated in Figs. 1 and 2 of the drawings. When in the position shown the arm or end 7 of the coiled spring 5 will be placed under tension. With the parts in the position shown in Figs. 1 and 2 of the drawings the trap is set. Should a mouse or a rat try to eat the bait 22 the trip or trigger will be lowered sufficiently to release the end of the rod 27 from the opening 20 and the arm or end 14 of the spring 12 will throw the swinging member over the supplemental base 9 into position illustrated by dotted lines in Fig. 1. When the swinging member 11 is released it in turn releases the end of the rod 28 and the swinging member 2 which is swung by means of the arm or end 7 of the spring 5 into the position shown by dotted lines in Fig. 1. It will be seen that the swinging member 11 is considerably smaller than the swinging member 2 the smaller member 11 being adapted for catching the mice and the swinging member 2 for catching the rats. No matter whether a rat or a mouse operates the trip or trigger one or the other of the swinging members will engage the same thereby adapting a single trap for either a mouse or a rat. I have also provided a novel form of trip or trigger which may be easily secured to the supplemental base and this trip or trigger is so formed and provided with means whereby the bait may be secured thereto against accidental displacement.

Having fully described my invention what I claim as new and desire to secure by Letters Patent is:

1. A trap including a base, a plurality of spring controlled members connected to the base for swinging movement, means engageable with the swinging members for holding the springs under tension, a trip for releasing said holding means, said trip having upwardly extending portions formed thereon to receive the bait, and means passing through said upwardly extending members and the bait for securing the bait to the trip.

2. A trap including a base, a plurality of spring controlled members connected to the base for swinging movement, means engageable with the swinging members for holding the springs under tension, a trip for releasing said holding means, said trip having upwardly extending portions formed thereon to receive the bait, and a pin passing through said upwardly extending members and the bait for securing the bait to the trip.

3. A trap including a main base, a supplemental base secured to and supported by the main base, a spring controlled member connected to the main base for swinging movement and having a portion extending transversely of the main base and positioned adjacent one edge of the supplemental base, a spring controlled member connected to the supplemental base for swinging movement and adapted to be positioned over the transversely extending portion of the spring controlled member connected to the main base, means for holding said members with their springs under tension, and means for releasing said holding means, the supplemental base permitting the spring controlled member connected thereto to assume a substantially horizontal position when the spring thereof is under tension.

In testimony whereof I hereunto affix my signature.

FRANK J. EBEL.